G. SUIDA.
HYDRAULIC COMPRESSOR.
APPLICATION FILED OCT. 5, 1912.
1,059,232.
Patented Apr. 15, 1913.
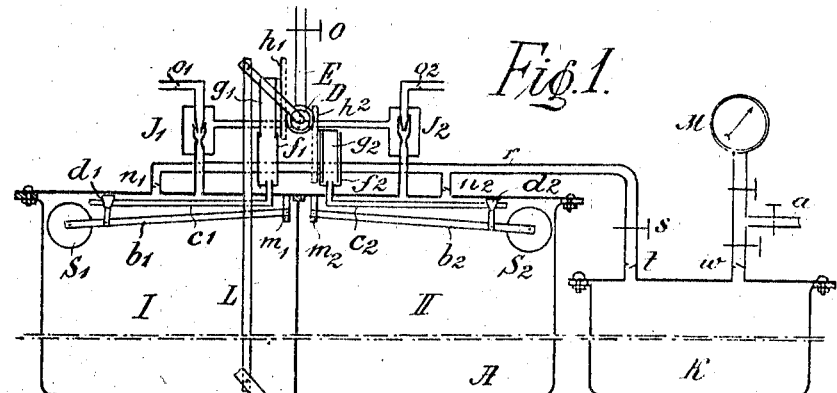
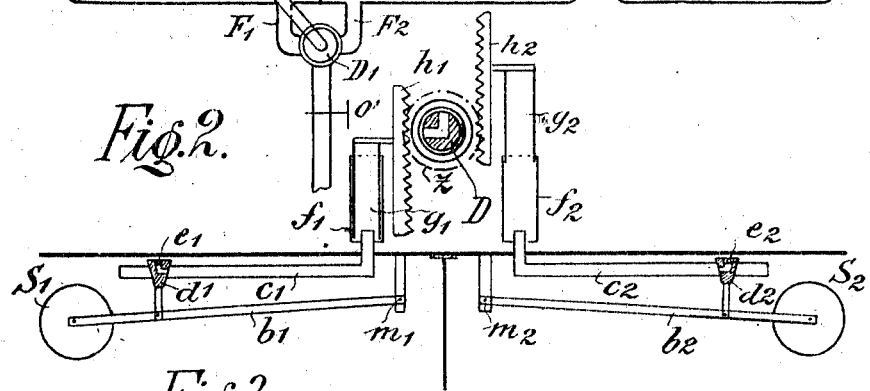
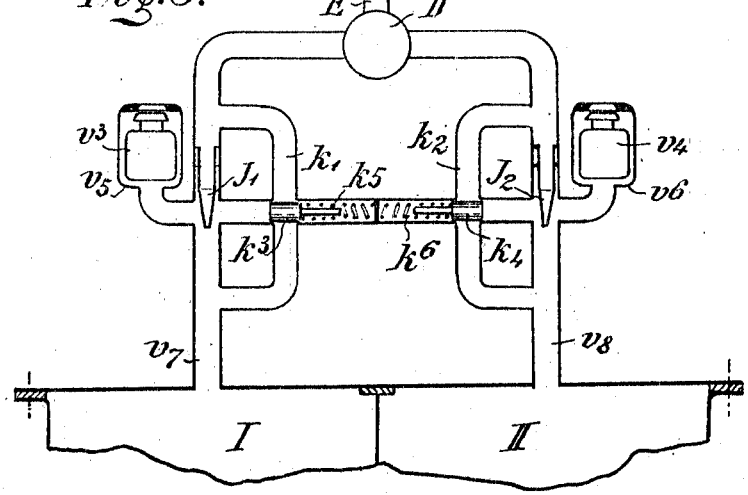

UNITED STATES PATENT OFFICE.

GUSTAV SUIDA, OF VIENNA, AUSTRIA-HUNGARY.

HYDRAULIC COMPRESSOR.

1,059,232.  Specification of Letters Patent.  Patented Apr. 15, 1913.

Application filed October 5, 1912. Serial No. 724,136.

*To all whom it may concern:*

Be it known that I, GUSTAV SUIDA, a subject of the Emperor of Austria-Hungary, residing at Vienna, Empire of Austria-Hungary, have invented certain new and useful Improvements in Hydraulic Compressors; and I do hereby declare the following to be a full, clear, and exact description of the invention, such as will enable others skilled in the art to which it appertains to make and use the same.

This invention relates to hydraulic compressors and has for its object to provide a reliable and efficient hydraulic compressor of simple construction.

In the annexed drawing Figure 1 is a diagrammatic section of a hydraulic compressor embodying this invention. Fig. 2 shows a detail of the same on a larger scale, Fig. 3 shows a modification.

I and II, Figs. 1 and 3 are two compressor chambers arranged side by side.

K is the holder for the compressed air provided with a pipe $w$ leading to a pressure gage M, a pipe $a$ leading to the consumption devices for the compressed air branching off from the pipe $w$, and cocks or valves being suitably arranged in the pipes $w$ and $a$ as usual. The holder K is further connected by a pipe $r$ to the compressor chambers I and II such pipe being provided with a cock or valve $s$ and a non-return valve $t$, non-return valves $n'$ $n^2$ being interposed between the pipe $r$ and the compressor chambers I and II.

Each of the compressor chambers I and II is provided with an air injector $J'$ $J^2$ respectively of the usual construction operated by water under pressure, the air admission pipes of such injectors being provided with non-return valves $o'$ and $o^2$ respectively. In each of the compressor chambers a lever $b'$ and $b^2$ respectively is pivoted at one of its ends $m'$ and $m^2$ respectively and carries a float $S'$ and $S^2$ respectively at its other end. Each of these levers is adapted to operate a valve $d'$ and $d^2$ in a pipe $c'$ and $c^2$ respectively connecting the air space of the compressor chambers I and II respectively with cylinders $f'$ and $f^2$ mounted on such compressor chambers.

$g'$ and $g^2$ are plungers working in the cylinders $f'$ and $f^2$ respectively and carrying racks $h'$ $h^2$ respectively engaging into a pinion $z$ in a two way cock D in the water supply pipe E. This cock controls the admission of water to the two injectors $J'$ and $J^2$ in such a manner that water is supplied to the injectors alternately.

$F'$ and $F^2$ are the water escape pipes of the compressor chambers I and II respectively.

D is a cock connected with the cock $D'$ by a suitable link and lever gearing L and controlling the escape of water through the pipes $F'$ $F^2$ so that when water is supplied to the compressor chamber I through its injector $J'$ the cock $D'$ shuts the escape pipe $F'$ and leaves open the pipe $F^2$.

Assuming now that the escape pipe $F^2$ is shut off by the cock $D'$ and the injector $J^2$ is connected with the water supply pipe E by the cock D the water under pressure will rush into the compressor chamber II containing air under atmospheric pressure through the injector $J^2$ forcing at the same time air into such chamber, thus increasing the quantity of air contained in the chamber $J^2$ and compressing it until owing to the increase of air pressure the suction through the injector ceases while the water continues to flow into the compressor chamber II, thereby further compressing the air contained therein which flows through the non-return valve $n^2$ and the pipe $r$ into the holder K. Escape of water under pressure through the injector $J^2$ to the outside is prevented by the non-return valve $o'$. When the level of the water in the compressor chamber II has reached a predetermined limit the float $S^2$ in this chamber will be raised thereby opening the valve $d^2$ and causing air under pressure to flow through the pipe $c^2$ into the cylinder $f^2$ whereby the plunger $g^2$ is raised into the position shown in Fig. 2 and the rack $h^2$ is caused to rotate through the medium of the pinion $z$ and the cock D to such an extent that the supply of water under pressure to the injector $J^2$ is shut off but is opened to the injector $J'$ of the other compressor chamber I. The water now rushes into the latter and compresses the air therein the same as just described for the compressor chamber II while the water is discharged from the chamber II through the pipe $F^2$ and the cock $D'$ which has been brought into the proper position by the cock D through the medium of the link and lever gear L. When the water begins to escape from the chamber II any water that may have been retained in the corresponding injector flows down into this chamber II and air flows freely through the non-return valve $o^2$ and the injector into this chamber whereby the latter is filled with air under atmospheric pressure. The float $S^2$ moves downward closing the valve $d^2$ but a non-return valve $e^2$ connected with or mounted in the valve $d^2$ is opened by the air under pressure in the cylinder $f^2$ whereby the air pressure in this cylinder is also reduced to atmospheric pressure. The non-return valve $n^2$ prevents air under pressure from escaping from the holder K into the chamber II while the water is being discharged from the latter. As soon as the compressor chamber I is so far filled with water that the float $S'$ in the same is raised permitting air under pressure to flow from the chamber I through pipe $c'$ and valve $d'$ into the cylinder $f'$ the plunger $g'$ of the latter is raised (the air pressure in the cylinder $f^2$ having been reduced to the atmospheric pressure as above described) and the cocks D D' are so turned as to cut off the water supply from the injector J' and to shut the water discharge pipe $F^2$ and to open the water supply pipe $F'$. The chamber II is then again filled with water while water is discharged from the chamber I and the air under pressure escapes from the cylinder $f'$ and a non-return valve $e'$ connected with or arranged in the valve $d'$ into the chamber I. Thus water is alternately supplied to and discharged from the chambers I and II which in turn supply air under pressure alternately to the holder K so that the apparatus operates practically continuously as long as water under pressure is supplied to the pipe E. The valves or cocks O O' are preferably so adjusted that the same time is required for filling one chamber and for discharging the water from the other.

In the modification shown in Fig. 3 for the non-return valves $o'$ $o^2$ float valves $v^3$ $v^4$ in float valve chambers $v^5$ $v^6$ respectively are substituted which are connected with the pipes $v^7$ $v^8$ leading from the injectors J' $J^2$ respectively to the compressor chambers I and II respectively. The operation of these float valves is exactly the same as that of the non-return valves $o'$ $o^2$. As the air pressure rises in the compressor chambers the air suction of the injectors through the float valve chambers $v^5$ $v^6$ ceases and the water level rises in the injectors and in the float valve chambers whereby the floats are raised against their seats thus preventing any water from escaping through the chambers $v^5$ $v^6$. Moreover by-passes $k'$ $k^2$ respectively are arranged to each of the injectors J' $J^2$ such by-passes being provided with valves $k^3$ and $k^4$ respectively, normally closing the same. These valves are acted upon on the one hand by the water pressure in the corresponding injector and on the other hand by springs $k^5$ $k^6$ respectively. When the pressure of the air in the compressor chamber which is being filled with water has risen so far that the valve $k^3$ or $k^4$ is forced back against the action of its spring $k^5$ or $k^6$ respectively thereby opening the corresponding by-pass $k'$ or $k^2$ respectively so that the water will flow into the compressor chamber not only through the injector but also through its by-pass whereby the filling of the compressor chambers with water is accelerated. In all other respects the construction and operation of the modification shown in Fig. 3 is exactly the same as those of the apparatus shown in Figs. 1 and 2.

Claims:

1. In a hydraulic compressor the combination of two compressor chambers, a holder for compressed air, pipes connecting such holder with the compressor chambers, non-return valves in such pipes, water discharge pipes for the compressor chambers, a cock adapted to control such discharge pipes, hydraulic air injectors, one for each compressor chamber, each comprising a pipe for supplying water and a pipe for supplying air to the same, an automatic valve in the air supply pipe of each injector, a cock for controlling the water supply pipes of both injectors, a link and lever gearing connecting the water discharge cock with the water supply cock of the injectors and means for rocking the water supply cock of the injectors, such means comprising floats, one mounted in each compressor chamber, cylinders, one for each float, means controlled by such float for admitting air under pressure into the cylinders, plungers working in such cylinders and means for transmitting movement from the said plungers to the said water supply cock of the injectors, substantially as and for the purpose described.

2. In a hydraulic compressor the combination of two compressor chambers, a holder for compressed air, pipes connecting such holder with the compressor chambers, non-return valves in such pipes, water discharge pipes for the compressor chambers, a cock adapted to control such discharge pipes, hydraulic air injectors, one for each compressor chamber, each comprising a pipe for supplying water and a pipe for supplying air to the same, an automatic valve in the air supply pipe of each injector, a cock for controlling the water supply pipes of both injectors, a link and lever gearing connecting the water discharge cock with the water supply cock of the injectors and means for rocking the water supply cock of the injectors, such means comprising floats, one mounted in each compressor chamber, cylinders, one for each float, means controlled by such float for admitting air under pressure into the cylinders, plungers working in such cylinders, racks carried by such plungers and a pinion on the water supply cock for the injectors and engaging into the said racks, substantially as and for the purpose described.

3. In a hydraulic compressor the combination of two compressor chambers, a holder for compressed air, pipes connecting such holder with the compressor chambers, non-return valves in such pipes, water discharge pipes for the compressor chambers, a cock adapted to control such discharge pipes, hydraulic air injectors, one for each compressor chamber, each comprising a pipe for supplying water and a pipe for supplying air to the same, an automatic valve in the air supply pipe of each injector, a cock for controlling the water supply pipes of both injectors, a link and lever gearing connecting the water discharge cock with the water supply cock of the injectors and means for rocking the water supply cock of the injectors, such means comprising floats, one mounted in each compressor chamber, cylinders, one for each float, pipes connecting such cylinders with their compressor chambers, a valve in each of such pipes, such valve being connected with the corresponding float, plungers working in such cylinders and means for transmitting movement from the said plungers to the said water supply cock of the injectors, substantially as and for the purpose described.

4. In a hydraulic compressor the combination of two compressor chambers, a holder for compressed air, pipes connecting such holder with the compressor chambers, non-return valves in such pipes, water discharge pipes for the compressor chambers, a cock adapted to control such discharge pipes, hydraulic air injectors, one for each compressor chamber, each comprising a pipe for supplying water and a pipe for supplying air to the same, an automatic valve in the air supply pipe of each injector, a cock for controlling the water supply pipes of both injectors, a link and lever gearing connecting the water discharge cock with the water supply cock of the injectors and means for rocking the water supply cock of the injectors, such means comprising floats one mounted in each compressor chamber, cylinders, one for each float, pipes connecting such cylinders with their compressor chambers, a valve in each of such pipes, such valve being connected with the corresponding float, a non-return valve connected with such valve and opening toward the compressor chambers, plungers working in such cylinders and means for transmitting movement from the said plungers to the said water supply cock of the injectors, substantially as and for the purpose described.

5. In a hydraulic compressor the combination of two compressor chambers, a holder for compressed air, pipes connecting such holder with the compressor chambers, non-return valves in such pipes, water discharge pipes for the compressor chambers, a cock adapted to control such discharge pipes, hydraulic air injectors, one for each compressor chamber, each comprising a pipe for supplying water and a pipe for supplying air to the same, an automatic valve in the air supply pipe of each injector, a cock for controlling the water supply pipes of both injectors, a link and lever gearing connecting the water discharge cock with the water supply cock of the injectors, a by pass to each injector, a valve in such by pass adapted to be opened by the water under pressure in the injector, a spring for closing such valve, and means for rocking the water supply cock of the injectors, such means comprising floats, one mounted in each compressor chamber, cylinders, one for each float, means controlled by such float for admitting air under pressure into the cylinders, plungers working in such cylinders and means for transmitting movement from the said plungers to the said water supply cock of the injectors, substantially as and for the purpose described.

In testimony whereof, I affix my signature, in presence of two witnesses.

GUSTAV SUIDA.

Witnesses:
ARTHUR BAUMANN,
AUGUST FUGGER.